(12) United States Patent
Clabau et al.

(10) Patent No.: US 10,191,280 B2
(45) Date of Patent: Jan. 29, 2019

(54) GLASS PANEL FOR DISPLAY SYSTEM

(71) Applicant: SEKISUI CHEMICAL CO., LTD., Osaka, Osaka (JP)

(72) Inventors: Frédéric Clabau, Paris (FR); Michael Labrot, Aachen (DE); Marc Lemaire, Villeurbanne (FR); Marie-Christine Duclos, Villeurbanne (FR); Estelle Metay, Vaulx en Velin (FR)

(73) Assignee: SEKISUI CHEMICAL CO., LTD., Osaka (JP)

( * ) Notice: Subject to any disclaimer, the term of this patent is extended or adjusted under 35 U.S.C. 154(b) by 242 days.

(21) Appl. No.: 15/031,118

(22) PCT Filed: Oct. 15, 2014

(86) PCT No.: PCT/FR2014/052625
§ 371 (c)(1),
(2) Date: Apr. 21, 2016

(87) PCT Pub. No.: WO2015/059385
PCT Pub. Date: Apr. 30, 2015

(65) Prior Publication Data
US 2016/0266382 A1 Sep. 15, 2016

(30) Foreign Application Priority Data
Oct. 22, 2013 (FR) ...................................... 13 60288

(51) Int. Cl.
*G02B 27/01* (2006.01)
*B32B 17/10* (2006.01)
(Continued)

(52) U.S. Cl.
CPC .... *G02B 27/0101* (2013.01); *B32B 17/10036* (2013.01); *B32B 17/1055* (2013.01);
(Continued)

(58) Field of Classification Search
None
See application file for complete search history.

(56) References Cited

U.S. PATENT DOCUMENTS 5,013,134 A 5/1991 Smith
6,979,499 B2 12/2005 Walck et al.
(Continued)

FOREIGN PATENT DOCUMENTS

CN 1537247 A 10/2004
CN 101236301 A 8/2008
(Continued)

OTHER PUBLICATIONS

International Search Report as issued in International Patent Application No. PCT/FR2014/052625, dated Feb. 6, 2015.
(Continued)

*Primary Examiner* — Gregory D Clark
(74) *Attorney, Agent, or Firm* — Cheng Law Group, PLLC

(57) ABSTRACT

A glazing for information display includes an assembly of two transparent inorganic or plastic sheets, connected together by a thermoplastic or adhesive interlayer or by multilayer sheets incorporating the interlayer, wherein a luminophore material is incorporated to enable the display. One of the luminophores includes a benzene ring substituted at least by: a first ester —COOR group, wherein R is a linear or branched carbon-based group including a main carbon-based chain of at least six consecutive carbon atoms, the R group including, if the chain is linear, more than 10 carbon atoms and, if the chain is branched, at least 7 carbon atoms, optionally a second —COOR' group, wherein R' is another hydrocarbon-based group or hydrogen, the second group optionally being in para position on the benzene ring with
(Continued)

respect to the first ester group, two hydroxyl —OH groups that are optionally in para position on the benzene ring.

18 Claims, 1 Drawing Sheet

(51) Int. Cl.
  *F21V 9/30* (2018.01)
  *F21W 131/405* (2006.01)
  *F21Y 101/00* (2016.01)

(52) U.S. Cl.
  CPC .. *B32B 17/10541* (2013.01); *B32B 17/10669* (2013.01); *B32B 17/10761* (2013.01); *F21V 9/30* (2018.02); *B32B 2250/02* (2013.01); *B32B 2255/24* (2013.01); *B32B 2255/26* (2013.01); *B32B 2307/412* (2013.01); *B32B 2307/422* (2013.01); *B32B 2590/00* (2013.01); *B32B 2605/006* (2013.01); *B32B 2605/08* (2013.01); *B32B 2605/18* (2013.01); *F21W 2131/405* (2013.01); *F21Y 2101/00* (2013.01)

(56) References Cited

U.S. PATENT DOCUMENTS

| | | |
|---|---|---|
| 2004/0166288 A1 | 8/2004 | Travis et al. |
| 2004/0232826 A1 | 11/2004 | Liu et al. |
| 2005/0231652 A1 | 10/2005 | Liu et al. |
| 2007/0269639 A1 | 11/2007 | Travis et al. |
| 2008/0075923 A1 | 3/2008 | Travis et al. |
| 2008/0158510 A1 | 7/2008 | Tant et al. |
| 2012/0068083 A1* | 3/2012 | Labrot .................... B32B 17/10 250/461.1 |
| 2012/0276651 A1 | 11/2012 | Kim et al. |

FOREIGN PATENT DOCUMENTS

| | | |
|---|---|---|
| CN | 102458835 A | 5/2012 |
| EP | 0 893 340 A1 | 1/1999 |
| FR | 2 929 017 A1 | 9/2009 |
| IN | 8458/CHENP/2011 | 5/2013 |
| WO | WO 2007/003849 A2 | 1/2007 |
| WO | WO 2009/122094 A1 | 10/2009 |
| WO | WO 2010/139889 A1 | 12/2010 |
| WO | WO-2010/139889 A1 | 12/2010 |

OTHER PUBLICATIONS

The First Office Action for the Application No. 201480058166.7 from The State Intellectual Property Office of the People's Republic of China dated Mar. 3, 2017.

Examination Report for the Application No. 201627011011 from the Intellectual Property India Patent Office dated Jul. 12, 2018.

\* cited by examiner

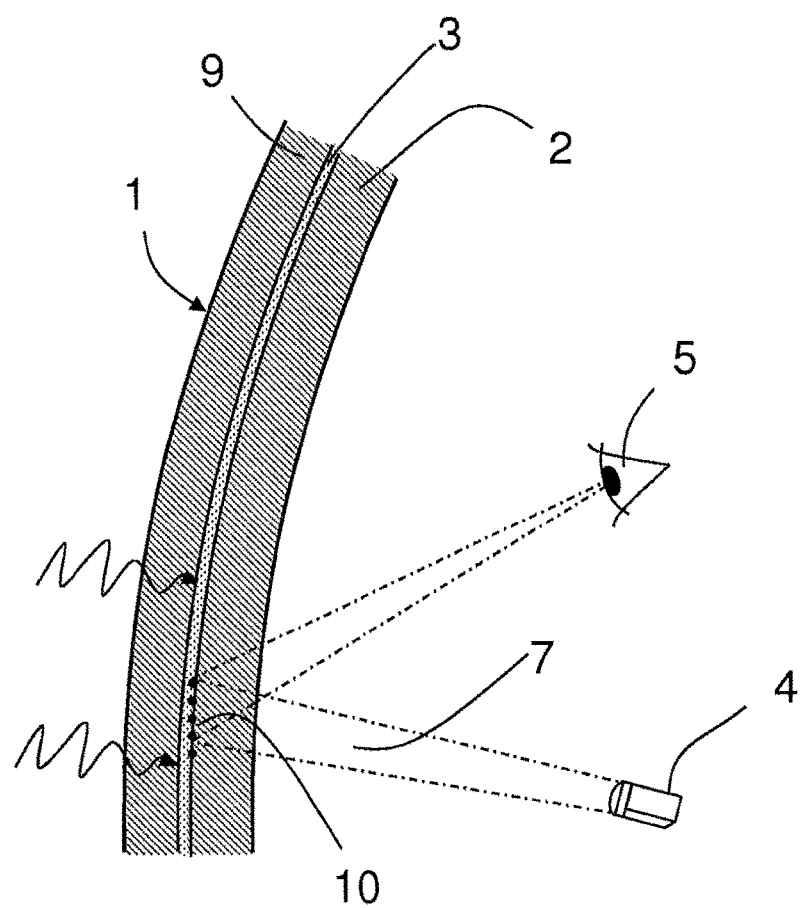

GLASS PANEL FOR DISPLAY SYSTEM

This application is the U.S. National Stage of PCT/FR2014/052625, filed Oct. 15, 2014, which in turn claims priority to French Application No. 1360288, filed Oct. 22, 2013. The contents of all of these applications are incorporated herein by reference in their entirety.

The present invention relates to the field of display systems using transparent supports made of inorganic glass or made of rigid plastic, in particular motor vehicle windshields or glazing for buildings, in particular store windows.

Most particularly, even though it is not limited thereto, the present invention relates to the field of display systems referred to in the art as head-up display (HUD) systems. Such systems are of use in particular in aircraft cockpits, trains but also nowadays in private motor vehicles (cars, trucks, etc.). These systems make it possible in particular to inform the driver of the vehicle without him looking away from the field of view ahead of the vehicle, thereby greatly increasing safety.

In such systems, the glazing generally consists of a sandwich structure, most simply comprising two sheets of rigid material such as sheets of glass. The sheets of rigid material are connected together by a thermoplastic interlayer sheet usually comprising or consisting of polyvinyl butyral (PVB). Without departing from the scope of the invention, in particular in the field of aviation or of safety glazing having ballistic-resistant properties, the glazing may also be formed from transparent rigid plastic sheets, for example made of polycarbonate or of PMMA, or from an assembly of a glass sheet and one such rigid plastic sheet. Equally, the glazing according to the invention may comprise a sheet of glass or of transparent rigid plastic, in particular of the aforementioned type, and a sheet of flexible plastic bonded to said rigid sheet. The term "rigid" is understood to mean that the mechanical characteristics of the substrate are suitable for use of the support as building glazing, windshield, etc.

Most conventionally, the display of information in the car is obtained by projecting an image onto a windshield having a laminated structure, that is to say formed from two sheets of glass and a thermoplastic interlayer. However, the driver then sees a double image: a first image reflected by the surface of the windshield facing the interior of the passenger compartment and a second image by reflection on the exterior surface of the windshield, these two images being slightly offset with respect to one another. This offset may cause the information seen to be disturbed. In order to overcome this problem, mention may be made of the solution proposed in U.S. Pat. No 5,013,134, in which a head-up display system is described that uses a laminated windshield formed from two sheets of glass and a polyvinyl butyral (PVB) interlayer, the two outer faces of which are not parallel but wedge-shaped, so that the image projected by a display source and reflected by the side of the windshield facing the passenger compartment are practically superimposed on the same image originating from the same source reflected by the side of the windshield facing the outside. In order to eliminate the double image, wedge-shaped laminated glazing is conventionally produced by using an interlayer sheet having a thickness that decreases from the top edge of the glazing to the bottom edge. However, it is necessary for the PVB profile to be very regular and not to have thickness variations, as these are transmitted during assembly to the windshield and lead to local angle variations.

Alternatively, it is proposed in U.S. Pat. No. 6,979,499 B2 to send an incident beam, of appropriate wavelength, to luminophores directly incorporated into the glazing, which are capable of responding to the excitation by emitting light radiation in the visible light range. In this way, a real, and no longer virtual, image is formed directly on the windshield. This image is also visible by all the passengers of the vehicle. U.S. Pat. No. 6,979,499 B2 describes in particular laminated glazing with an interlayer sheet of polyvinyl butyral (PVB) type, the two outer faces of which are parallel and in which an additional layer of luminophores is incorporated. The luminophores are selected as a function of the wavelength of the incident excitation radiation. This wavelength usually lies in the UV-visible range, in particular between 350 and 410 nm, more rarely in the IR range. The luminophores, under this incident radiation, re-emit radiation in the visible range. It is referred to as down-conversion when the incident radiation is UV radiation and as up-conversion when the incident radiation is IR radiation. According to this document, such a construction makes it possible to reproduce an image of any object directly on the windshield or glazing. According to this disclosure, luminophore materials are deposited over at least one portion of the surface of one of the sheets constituting the laminated glazing (PVB or glass), in the form of a continuous layer optionally comprising several types of luminophores. The desired image is obtained by selective excitation of a given area of the luminophore layer. The location of the image and its shape are obtained by means of an excitation source controlled and modulated by external means.

Experiments carried out by the applicant have shown that such HUD devices, incorporating luminophores into the assembled glazing, are characterized by too weak a luminance under a conventionally unfocused UV excitation source. Yet, the concentration of the luminophores is limited by the haze value and by the color of the windshield, which must not be too pronounced so as not to obstruct the driver's vision.

In particular, it appears that the luminous intensity obtained with such devices still remains highly insufficient when the external luminosity is high, and generally in daytime vision, since it does not exceed a few tens of candelas. Typically, it has been measured on a conventional "HUD" system, i.e. that operates according to the principles of reflection, that monochromatic radiation was visible by an observer, for example in the viewing area of the driver of a vehicle, if the luminance was of the order of several hundreds of $cd/m^2$, in particular notably greater than 500 $cd/m^2$, or even 1000 $cd/m^2$, under normal daytime external lighting conditions of the windshield.

In order to obtain such a luminance, it is possible to use excitation sources that generate concentrated and directed light, delivered by more specific sources of diode, optionally laser diode, type. The term "concentrated" is understood in the context of the present description to mean that the surface power density, on the glazing, of the beam output by the generating source is greater than 120 $mW \cdot cm^{-2}$ and preferably between 200 $mW \cdot cm^{-2}$ and 20 000 $mW \cdot cm^{-2}$, or even between 500 $mW \cdot cm^{-2}$ and 10 000 $mW \cdot cm^{-2}$. However, the use of such sources can be envisaged only with power levels that remain limited, so as to avoid problems linked to the dangerousness of the beam, in particular on the outside of the vehicle.

Another crucial problem linked to the use of concentrated light sources, in particular of laser light, stems from the choice of the luminophore used: this must have a high incident radiation conversion efficiency but must not degrade under external UV radiation nor under the incident excitation radiation when this is of laser type, in order to ensure a suitable lifetime of the display function.

In such glazing that enables information to be displayed directly on its surface, the choice of the luminophore thus appears crucial and is inevitably a compromise between various characteristics and properties linked to such a use, among which the most important are:

- a high luminance provided by a high quantum efficiency under the incident excitation radiation,
- a satisfactory durability with respect to incident excitation radiation, in particular laser radiation, as in particular measured by the time observed before the initial luminance is halved,
- a maximum durability with respect to the incident solar UV radiation, in particular as measured by the Arizona-WOM® test in the field,
- a transparency such that the light transmission is greater than 70%, as measured according to the ISO 9050 (2003) standard.
- a chemical compatibility with the thermoplastic sheet forming the glazing,
- a relatively neutral color, in particular when the luminophore is present in a high concentration in the glazing, such as for example measured by the "Yellowness Index" test according to the DIN 6167 standard.

In order to solve all of the problems disclosed above, patent application WO 2010/139889 already describes the use of a luminophore material of hydroxy-terephthalate type, having a high luminance due to a very good quantum efficiency under incident UV-visible excitation and a good durability in aging tests under UV radiation.

While the compounds described in this prior patent application have very good general properties, it remains advantageous to further increase the performances thereof, in particular the maximum luminance of the glazing under UV-visible excitation. This is because such a property is a key factor in the technology, the highest luminances obviously allowing a better visualization of the information displayed, especially under conditions of strong illumination of the glazing.

The present invention relates to glazing comprising luminophore compounds having luminance properties greater than those described in patent application WO 2010/139889, while maintaining the good characteristics and properties, linked to their use for displaying information, reported above.

More specifically, the present invention relates to a glazing for information display, in particular to a motor vehicle windshield or glazing for a building, comprising an assembly of two transparent sheets, consisting of inorganic glass or of plastic, the two sheets being connected together by a thermoplastic or adhesive interlayer or by multilayer sheets incorporating such an interlayer, at least one luminophore material enabling said display being moreover incorporated into said glazing.

According to the present invention, at least one of said luminophore materials comprises a benzene ring substituted at least by:

- a first ester —COOR group, wherein R is a linear or branched carbon-based group comprising a main carbon-based chain of at least six carbon atoms bonded to one another consecutively, said R group comprising, if said chain is linear, more than 10 carbon atoms in total and, if said chain is branched, at least 7 carbon atoms in total, and
- two hydroxyl —OH groups.

Preferably, the benzene ring is additionally substituted by a second —COOR' group, wherein R' is another hydrocarbon-based group or hydrogen, said second group preferably being in para position on the benzene ring with respect to said first ester group.

According to the invention, the luminophore is incorporated into said interlayer or else positioned between this interlayer and one of the transparent sheets or else incorporated into an optional plastic transparent sheet.

Preferably, the luminophore is incorporated into the interlayer, in particular when the latter is made of PVB.

According to certain advantageous but nonlimiting embodiments of the present invention, which may where appropriate be combined together:

the luminophore comprises a benzene ring substituted by four groups, including:

two ester groups, respectively —COOR and —COOR'; R and R' being linear or branched carbon-based groups comprising a main carbon-based chain of at least six carbon atoms bonded together consecutively, said R' group comprising, if said chain is linear, more than 10 carbon atoms in total and, if it is branched, at least 7 carbon atoms in total, the two ester groups preferably being in para position on the benzene ring, two hydroxyl —OH groups, the two hydroxyl groups preferably being in para position on the benzene ring;

R and R' are identical carbon-based groups;

R and preferably R' are branched carbon-based groups comprising at least 8 carbon atoms;

R and preferably R' are linear carbon-based groups comprising more than 10 successive carbon atoms, in particular between 11 and 15 successive carbon atoms;

said luminophore is a dialkyl 2,5-dihydroxyterephthalate corresponding to the structural formula:

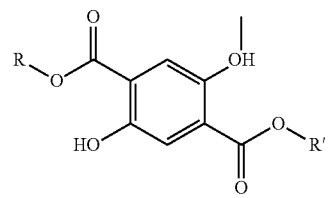

said luminophore is a dialkyl 2,5-dihydroxyterephthalate corresponding to the structural formula:

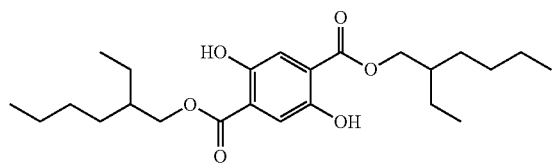 [SMILES: CCCCC(CC)COC(=O)c1cc(O)c(C(=O)OCC(CC)CCCC)cc1O]

said luminophore is a dialkyl 2,5-dihydroxyterephthalate corresponding to the structural formula:

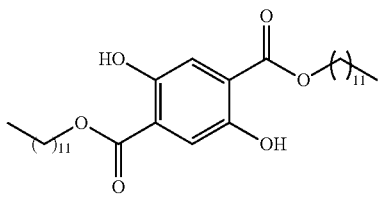

the interlayer is made of thermoplastic and said luminophore is dispersed in said thermoplastic;

the thermoplastic constituting said interlayer is selected from the group of PVBs, plasticized PVCs, polyurethane PU or ethylene/vinyl acetates EVAs. Preferably, the thermoplastic is a PVB;

the glazing is a motor vehicle or aircraft windshield comprising an assembly of two transparent sheets, consisting of inorganic glass or of strong plastic such as PMMA or polycarbonate, connected together by a thermoplastic or adhesive interlayer;

the glazing is glazing for a building, in particular a store window, a spandrel glass or a dividing wall or partition.

According to one aspect of the present invention, the glazing according to the invention is a windshield for a motor vehicle. Such laminated glazing then customarily consists of an assembly of two rigid sheets of inorganic glass connected by an interlayer made of a thermoplastic.

According to one possible embodiment, the transparent sheets are connected together by a multilayer sheet incorporating a succession of PVB/PET/PVB layers, in which PET is polyethylene terephthalate.

Laminated glazing according to the invention may in particular be obtained by a process in which the thin layer of luminophores is deposited on one of the glass panes of the glazing or on the interlayer such as the PVB-type thermoplastic sheet by a technique selected from screenprinting, spraying, roller, coating or inkjet techniques or else techniques of the offset, flexographic or photogravure type, in the form of a solution containing a solvent and optionally a polymer binder, and then the glazing is laminated in an autoclave. The luminophores may also be introduced during the production, via extrusion, of the thermoplastic sheet, generally directly in powder form.

Typically, in such a windshield according to the invention, after the lamination step, the luminophore according to the invention is dispersed in said thermoplastic.

According to another aspect, the glazing according to the invention is an aviation windshield as described for example in the publications EP 0 893 340 B1 or WO 2007/003849.

According to a third aspect, the glazing according to the invention is glazing for a building, in particular a store window, a spandrel glass or a dividing wall or partition enabling the display of information by means of the latter.

Without departing from the scope of the invention, and according to a fourth aspect, the glazing may also consist of a sheet of glass, bonded to which, by means of an interlayer of an adhesive material, for example an acrylic adhesive, is a sheet of flexible plastic, for example made of polyester.

The invention lastly relates to a device for displaying an image on transparent glazing, comprising laminated glazing as claimed in one of the preceding embodiments and a source generating concentrated UV-visible radiation of laser type, the radiation of which is between 350 and 410 nm, the excitation radiation being directed toward the area(s) of the glazing comprising the luminophore.

In the display device, the source generating UV-visible radiation typically comprises at least one laser diode emitting UV-visible excitation radiation, the wavelength of which is less than 410 nm and preferably is of the order of 405 nm.

For example, the surface power density of the beam output by the generating source is greater than 120 $mW \cdot cm^{-2}$ and preferably between 200 $mW \cdot cm^{-2}$ and 20 000 $mW \cdot cm^{-2}$, or even between 500 $mW \cdot cm^{-2}$ and 10 000 $mW \cdot cm^{-2}$.

Preferably, the display device also comprises means for modulating the power of the source generating UV-visible radiation, in particular in order to adapt the luminance to the external lighting conditions of the glazing, for example as a function of the insolation conditions of the glazing.

For example, the modulation means may define at least one power suitable for daytime use and at least one power lower than the preceding one that is suitable for nighttime use.

The invention and its advantages will be better understood on reading the following embodiment of a laminated windshield according to the invention, in connection with the single appended FIGURE.

The appended FIGURE makes it possible to illustrate the invention and its advantages.

In this FIGURE, a windshield and a device according to the invention are schematically represented:

The windshield 1 is composed of two sheets 2 and 9 typically made of glass but which could also consist of strong plastic sheets of polycarbonate type. Present between the two sheets is a plastic interlayer sheet 3 such as PVB (polyvinyl butyral), plasticized PVC, PU or EVA or else a multilayer thermoplastic sheet incorporating for example PET (polyethylene terephthalate), the succession of the layers in which is for example PVB/PET/PVB.

Particles of organic luminophore according to the invention are inserted into the interlayer thermoplastic sheet 3 before the assembly of the various sheets, either directly during the extrusion of the thermoplastic sheet, or by virtue of a deposition by one of the techniques mentioned above. The deposition is carried out over at least one portion of the inner face of the inner sheet of the glazing or over at least one portion of the inner face of the thermoplastic sheet.

The luminophore particles before lamination have a size distribution predominantly between 1 and 100 microns. The term "predominantly" is understood to mean that more than 90% of the particles making up the commercial powder have a diameter of between 1 and 100 microns.

A laser source 4 that emits excitation light radiation is used to send incident concentrated radiation 7 having a wavelength close to 400 nm. The luminophore 10, present in molecular form in the interlayer thermoplastic sheet 3 after lamination, has a high absorption coefficient for the incident radiation. It therefore reemits intense radiation in the visible range.

The visible radiation emitted by the luminophore is then directly observable by the eye 5 of the driver, who thus sees the object on the windshield without having to avert his eyes from the road. In this way, an image can be directly formed on a laminated windshield without it being necessary to adapt the structure of the latter, for example the thickness of the interlayer sheet, thereby enabling economical production of HUD systems.

The source used for generating the concentrated radiation is for example a UV-visible source of laser type. It is for example, but not limitingly, of solid-state laser, semiconductor laser diode, gas laser, dye laser or excimer laser type.

Generally, any known source that generates a concentrated and directed flux, within the meaning of the present invention, of UV-visible radiation may be used as excitation source according to the invention.

According to one possible embodiment, it is possible to use a DLP projector in order to modulate the excitation wave according to the method described in patent application US 2005/231652, paragraph [0021]. It is also possible according to the invention to use, as UV-visible excitation source, a device as described in patent application US 2004/0232826, in particular as described in connection with FIG. 3.

As indicated above, the luminophore may be inserted into the PVB sheet during the extrusion of the latter, or else it may be deposited on the glass or the PVB sheet for example by screenprinting, spraying, roller, coating or inkjet techniques or else by techniques of the offset, flexographic or photogravure type.

Preferably, the deposition by one of the preceding techniques is carried out after dissolving or dispersing the luminophore particles in a solvent that evaporates rapidly, and which may also contain, in dissolved form, material constituting the thermoplastic sheet, for example PVB, in order to facilitate the incorporation of the luminophore into the thermoplastic sheet when the latter is itself made of PVB.

It has been found by the applicant that, within the context of an application for displaying an image by means of transparent glazing, the use of luminophores according to the invention makes it possible to effectively meet the following requirements, necessary for such an application:
a) an acceptable sharpness of the image,
b) a luminescence intensity sufficient for it to be observable by the driver,
c) a light transmission greater than 70%.

The preceding embodiment obviously in no way limits the present invention, in any of the aspects described above.

EXAMPLES

The following examples make it possible to illustrate an exemplary embodiment of a laminated windshield according to the present invention and the advantages thereof with respect to the prior art.

In the examples, various comparative laminated glazings and laminated glazings according to the present invention are synthesized. All the glazings comprise the succession of two sheets of glass connected by a PVB interlayer sheet having a thickness of 760 microns. The assembly is carried out according to the well-known techniques of the art.

Prior to the lamination, various luminophores, the formula of which is given below, are deposited as a square with dimensions of approximately 10×10 cm$^2$ by a conventional spraying technique. The luminophore is deposited onto the inner glass sheet 2, onto its side facing the PVB sheet, before the assembly step (see FIGURE).

More specifically, the luminophore is diluted beforehand in a solvent of ethanol or tetrahydrofuran (THF) type. The dilution is carried out close to the maximum solubility of the luminophore in the solvent in order to minimize the volume of solution.

The mixture is then deposited by spraying according to conventional techniques on the glass sheet, so as to obtain, after drying of the solvent, a weight of solids of the order of 5 g per m$^2$ of glass.

Next, the solvent is left to evaporate and then the lamination is carried out with the two glass sheets and the PVB sheet according to autoclave techniques conventional in the field. A windshield as illustrated in the FIGURE is thus obtained.

The parameters described above were measured on the various glazings obtained, according to the following protocols:

The haze was measured according to the motor vehicle standard Ansi Z26.1 (1996).

The heat resistance of the glazing was carried out in accordance with the test described in the European standard ECE R43 A3/5.

The absolute luminescence intensities were measured by a UV-visible spectrometer and compared to one another by dividing the maximum luminescence intensity by the molecular concentration of luminophores, for all of the molecules tested. A reference intensity 100 is attributed to the reference compound according to example 1.

The emissions that lie in wavelength ranges in which the sensitivity of the human eye varies greatly with the wavelength (in particular with a greater sensitivity in the green-yellow range). The relative luminances, taking into account the luminous efficacy of the human eye as a function of the emission wavelength, are also calculated on the basis of the preceding data, for all of the modules tested, for one and the same molecular concentration.

The durability to incident solar UV radiation was measured by the WOM Arizona® test which consists in exposing the glazing to radiation emitted by a xenon arc lamp in order to simulate solar radiation according to the ISO 4892 (part 2) standard at a temperature of 90° C. Such exposure enables accelerated aging of the luminophore by a factor of approximately 10. The measurement of the luminance after 3000 hours exposure (therefore corresponding substantially to 3 years of use under actual conditions), relative to the initial luminance, makes it possible to estimate and to compare, directly and simply, the durability properties of the various luminophores under UV radiation.

The coloration of the glazing was measured by the "Yellowness Index" test according to the DIN 6167 standard, after 400 hours of exposure of the glazing to the Arizona test described above.

The durability under excitation laser radiation was measured according to the following method:

A laser beam having a power of 200 mW and a wavelength equal to 405 nm was directed directly onto the portion of the glazing comprising the luminophore layer, over a surface area of around 2 mm$^2$. A luminance meter is directed at the light spot emitted and the luminance in cd/m$^2$ is measured continuously. Thus, the time needed for the initial luminance to be halved is measured, this value characterizing, according to the invention, the durability of the luminophore under the incident concentrated radiation.

The continuous illumination by a fixed spot of great power may lead to a rapid degradation of the luminophore and therefore to a rapid reduction in its luminance.

The molecules tested all correspond to the following general formula:

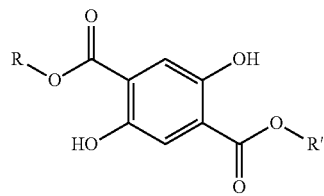

They are obtained by esterification of 2,5-dihydroxy-terephthalic acid with alcohols ROH for examples 1 to 5, or by reaction of the acid with N,N-dimethylformamide di-tert-butyl acetal for example 6.

The molecules synthesized are:

Example 1 (according to WO 2010/139889):

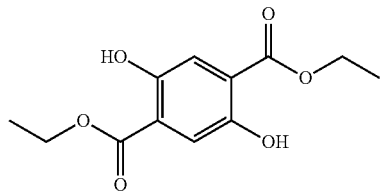 [SMILES: CCOC(=O)c1cc(O)c(C(=O)OCC)cc1O]

Example 2 (according to WO 2010/139889):

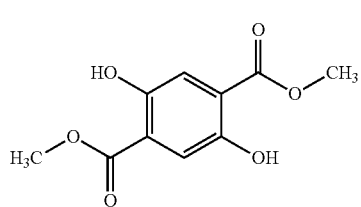

Example 3 (comparative):

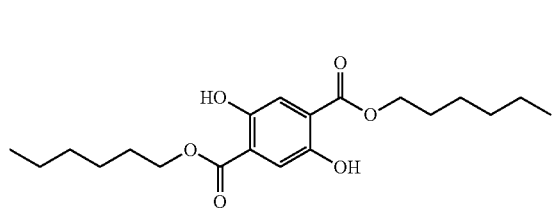 [SMILES: CCCCCCOC(=O)c1cc(O)c(C(=O)OCCCCCC)cc1O]

Example 4 (according to the invention):

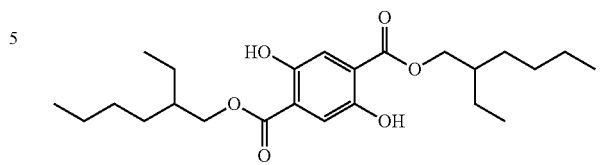

Example 5 (according to the invention):

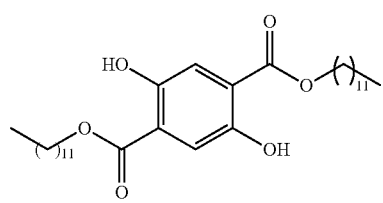

Example 6 (comparative):

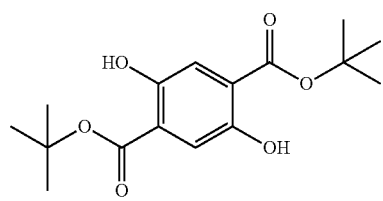 [SMILES: CC(C)(C)OC(=O)c1cc(O)c(C(=O)OC(C)(C)C)cc1O]

All of the results obtained are collated in table 1:

TABLE 1

|  | Example 1 (reference) | Example 2 (reference) | Example 3 (comparative) | Example 4 (invention) | Example 5 (invention) | Example 6 (comparative) |
| --- | --- | --- | --- | --- | --- | --- |
| Yellowness index (DIN 6167) after 400 h | No yellowing | No yellowing | No yellowing | No yellowing | No yellowing | No yellowing |
| Heat resistance (ECE R43 A3/5) | in accordance | in accordance | in accordance | in accordance | in accordance | in accordance |
| Light transmission | >70% | >70% | >70% | >70% | >70% | >70% |
| Durability under UV radiation UV (in % of the initial luminance at 450 nm after 3000 h) | 100 | 100 | 100 | 100 | 100 | 70 |
| Maximum emission $\lambda$ (nm) under laser beam (405 nm, 200 mW) | 450 nm | 450 nm | 450 nm | 450 nm | 450 nm | 450 nm |
| Perceived color | Blue | Blue | Blue | Blue | Blue | Blue |
| Relative luminance at 450 nm ($\lambda_{exc}$ = 405 nm) | 100 | 95 | 100 | 130 | 180 | 95 |
| Durability under laser excitation (405 nm, 200 mW) | >100 hours | >100 hours | >100 hours | >100 hours | >100 hours | >100 hours |

The results reported in table 1, in comparison with the reference luminophore according to example 1, show that the properties of luminescence and durability under laser excitation are similar for all the compounds tested. Furthermore, all are in accordance with the yellowness index and heat resistance tests.

The (Arizona) aging tests under UV radiation also show that all the compounds are in accordance, with the exception of the comparative compound according to example 6, the hydrocarbon-based chains of which, R and R', are branched groups of tert-butyl type, not in accordance with the subject of the invention.

The luminance measurements show that the compounds according to the invention, comprising a group incorporating a linear carbon-based chain of at least 6 atoms, have luminance values, at identical molar concentration, which are much higher than the reference compounds, enabling improved visualization of the information displayed, especially under conditions of strong illumination of the glazing.

In the foregoing description, the present invention has been described in connection with the use of glazing under laser excitation. It is very obvious that the present invention is not limited to this excitation method and that other sources of radiation, in particular power light-emitting diodes, may be used as source of excitation radiation, for example for displaying pictograms preprinted on said glazing, as described in patent application WO 2009/122094 or FR2929017.

Also, the invention relates to any glazing comprising a luminophore according to the invention, optionally as a mixture with other luminophores optionally emitting in other colors of the visible spectrum.

The invention claimed is:

1. A glazing for information display comprising an assembly of two transparent sheets, consisting of inorganic glass or of plastic, the two sheets being connected together by a thermoplastic or adhesive interlayer or by multilayer sheets incorporating such an interlayer, at least one luminophore material enabling said display being incorporated into said glazing, wherein at least one of said luminophore materials comprises a benzene ring substituted at least by:
   at least a first ester —COOR group, wherein R is a linear or branched carbon-based group comprising a main carbon-based chain of at least eleven carbon atoms bonded to one another consecutively, and
   two hydroxyl —OH groups.

2. The glazing as claimed in claim 1, wherein said benzene ring is substituted by a second —COOR' group, wherein R' is another hydrocarbon-based group or hydrogen.

3. The glazing as claimed in claim 1, wherein one of said luminophore materials comprises a benzene ring substituted by four groups, including:
   two ester groups, respectively —COOR and —COOR'; R and R' being linear or branched carbon-based groups comprising a main carbon-based chain of at least eleven consecutively bonded carbon atoms, and
   two hydroxyl —OH groups.

4. The glazing as claimed in claim 2, wherein R and R' are identical carbon-based groups.

5. The glazing as claimed in claim 2, wherein R and R' are linear carbon-based groups, the linear carbon-based groups in R and R' comprising at least eleven successive carbon atoms.

6. The glazing as claimed in claim 1, wherein said luminophore is a dialkyl 2,5-dihydroxyterephthalate corresponding to the structural formula:

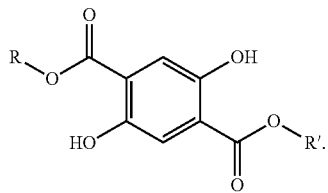

7. The glazing as claimed in claim 1, wherein said luminophore is a dialkyl 2,5-dihydroxyterephthalate corresponding to the structural formula;

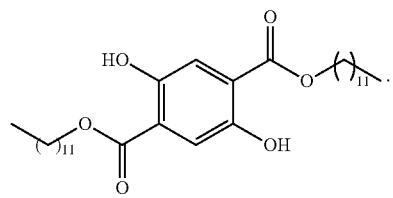

8. The glazing as claimed in claim 1, wherein the interlayer is made of thermoplastic and wherein said luminophore is dispersed in said thermoplastic.

9. The glazing as claimed in claim 1, wherein the thermoplastic constituting said interlayer is selected from the group consisting of PVBs, plasticized PVCs, polyurethane PU and ethylene/vinyl acetates EVAs.

10. A motor vehicle or aviation windshield consisting of glazing as claimed in claim 1, comprising an assembly of two transparent sheets, consisting of inorganic glass or of strong plastic, connected together by a thermoplastic or adhesive interlayer.

11. A glazing for a building, in particular a store window, a spandrel glass or a dividing wall or partition, as claimed in claim 1.

12. A device for displaying an image on transparent glazing, comprising glazing as claimed in claim 1 and a source configured to generate concentrated excitation radiation of diode type, the radiation of which is between 350 and 410 nm, the excitation radiation being directed toward an area of the glazing comprising the luminophore material.

13. The glazing as claimed in claim 1, wherein the two hydroxyl groups are in para position on the benzene ring.

14. The glazing as claimed in claim 2, wherein said second group is in para position on the benzene ring with respect to said first ester group.

15. The glazing as claimed in claim 3, wherein the two ester groups, respectively —COOR and —COOR', of the benzene ring substituted by four groups are in para position on the benzene ring, and wherein the two hydroxyl groups of the benzene ring substituted by four groups are in para position on the benzene ring.

16. The glazing as claimed in claim 5, wherein R and R' are linear carbon-based groups comprising between 11 and 15 successive carbon atoms.

17. The motor vehicle or aviation windshield as claimed in claim 10, wherein the strong plastic is PMMA or polycarbonate.

18. The device as claimed in claim 12, wherein the diode is a laser diode.

* * * * *